(12) United States Patent
Zhang et al.

(10) Patent No.: US 8,700,366 B1
(45) Date of Patent: *Apr. 15, 2014

(54) VARIABLE TRANSPORT DELAY MODELLING MECHANISM

(75) Inventors: Fu Zhang, Sherborn, MA (US); Murali Yeddanapudi, Watertown, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,891

(22) Filed: May 14, 2012

Related U.S. Application Data (63) Continuation-in-part of application No. 12/907,631, filed on Oct. 19, 2010, now Pat. No. 8,180,608, which is a continuation of application No. 11/221,160, filed on Sep. 6, 2005, now Pat. No. 7,835,889.

(51) Int. Cl.
*G06F 17/10* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| | | | |
|---|---|---|---|
| 4,550,318 A * | 10/1985 | Prengaman et al. | 342/90 |
| 6,732,064 B1 | 5/2004 | Kadtke et al. | |
| 7,495,450 B2 | 2/2009 | Furse et al. | |
| 2002/0064171 A1 | 5/2002 | Belk | |
| 2005/0259754 A1 | 11/2005 | Ho et al. | |
| 2008/0021679 A1 * | 1/2008 | Bleiweiss et al. | 703/2 |

OTHER PUBLICATIONS

Casetti, C. et al., "A Framework for the Analysis of Adaptive Voice over IP," ICC 2000, IEEE International Conference on Communications, vol. 2:821-826 (2000).

Dermanovic, B. et al., "Modeling of Transport Delay on ETHERNET Communication Networks," IEEE MELECON, pp. 367-370 (2004).

\* cited by examiner

*Primary Examiner* — Russell Frejd

(74) *Attorney, Agent, or Firm* — Nelson Mullins Riley & Scarborough LLP (57) ABSTRACT

A method, system and apparatus for managing data in a buffer reduces the data density of the buffer by downsampling input buffer data. The buffer holds a plurality of input data points associated with an index. The buffer may have a capacity and a data density that represents a logical distance between indices of adjacent input data points. When the buffer is at or near the capacity, a rule may be applied to the data buffer. The rule may downsample the input data and reduces the data density of the buffer. The rule may include, for example, removing every $k^{th}$ input data point, or removing the least-used data points. Removed data points may be retrieved by deriving the removed data points from data points that remain in the buffer.

20 Claims, 9 Drawing Sheets

| | 0 | 1 | 2 | 3 | 4 | 5 | 6 | 7 |
|---|---|---|---|---|---|---|---|---|
| t | 0 | 0.2 | 0.5 | 0.6 | 0.9 | 1.1 | 2 | 2.1 |
| x | 0 | 0.7 | 1.2 | 1.4 | 1.8 | 2 | 2.1 | 2.3 |
| u | 1 | 1.4 | 1.6 | 0.5 | 4.7 | 5.5 | 1.2 | 2 |
| L | 0.8 | 0.9 | 1.3 | 1.9 | 2.7 | 3.4 | 4.6 | 7.9 |

| 910 | 0 | 1 | 2 | 3 | 4 | ... | n |
|---|---|---|---|---|---|---|---|
| 920 | $i_0$ | $i_1$ | $i_2$ | $i_3$ | $i_4$ | ... | $i_n$ |
| 930 | $v_0$ | $v_1$ | $v_2$ | $v_3$ | $v_4$ | ... | $v_n$ |

| 0 | 1 | 2 | 3 | 4 | 5 | 6 |
|---|---|---|---|---|---|---|
| 5 | Ø | Ø | Ø | Ø | Ø | Ø |
| 25 | Ø | Ø | Ø | Ø | Ø | Ø |

*Fig. 11A*

| 0 | 1 | 2 | 3 | 4 | 5 | 6 |
|---|---|---|---|---|---|---|
| 5 | 10 | Ø | Ø | Ø | Ø | Ø |
| 25 | 100 | Ø | Ø | Ø | Ø | Ø |

*Fig. 11B*

| 0 | 1 | 2 | 3 | 4 | 5 | 6 |
|---|---|---|---|---|---|---|
| 5 | 10 | 15 | 20 | 25 | 30 | 35 |
| 25 | 100 | 225 | 400 | 625 | 900 | 1225 |

*Fig. 11C*

| 0 | 1 | 2 | 3 | 4 | 5 | 6 |
|---|---|---|---|---|---|---|
| 5 | 15 | 25 | 35 | Ø | Ø | Ø |
| 25 | 225 | 625 | 1225 | Ø | Ø | Ø |

*Fig. 11D*

| 0 | 1 | 2 | 3 | 4 | 5 | 6 |
|---|---|---|---|---|---|---|
| 5 | 15 | 25 | 35 | 40 | Ø | Ø |
| 25 | 225 | 625 | 1225 | 1600 | Ø | Ø |

VARIABLE TRANSPORT DELAY MODELLING MECHANISM

RELATED APPLICATIONS

The present application is a continuation-in-part of, and claims priority to, U.S. patent application Ser. No. 12/907,631, filed on Oct. 19, 2010, now U.S. Pat. No. 8,180,608, which is a continuation of U.S. patent application Ser. No. 11/221,160, filed on Sep. 6, 2005, now U.S. Pat. No. 7,835,889. The contents of the aforementioned applications are incorporated herein by reference.

BACKGROUND OF THE INVENTION

In a number of applications, data must be stored for future use. For example, some calculations require the use of previously-calculated data values in order to calculate the next data value in a series. Typically, these previously-calculated data values are stored in a data structure such as a buffer in order to provide access to the previously-calculated data values when the previously-calculated data values are next required.

However, data buffers do not have unlimited capacity. Eventually, as a buffer reaches its maximum capacity, some existing data in the buffer must be discarded if new data is to be stored. Discarding the data can be problematic because the deleted data may be required in the future. With conventional techniques, discarded data cannot be easily recovered if the discarded is needed again.

SUMMARY

Exemplary embodiments provide methods, systems, and electronic media for managing data in a buffer by downsampling input buffer data to reduce the data density of the buffer. The buffer may hold a plurality of input data points associated with an index. The buffer may have a capacity and a data density that represents a logical distance between indices of adjacent input data points. When the buffer is at or near the capacity, a rule may be applied to the data buffer. The rule may downsample the input data and reduce the data density of the buffer. The downsampling effectively results in removal of some data points in the input from the buffer. The removed data points may be retrieved by deriving the removed data points from data points that remain in the buffer.

According to one exemplary embodiment, a buffer may be stored in a storage of an electronic device. The buffer may hold a plurality of input data points. The input data points may be associated with an index that describes the input data points' chronological positions, physical positions, logical positions, or other positions relative to each other.

The input data points may represent or may be associated with, for example, a variable transport delay representative of delayed data provided to the buffer. A variable transport delay represents an amount of delay incurred when an object, such as a physical object (e.g., a fluid) or information (e.g., data) transits a certain amount of physical or logical space at a non-constant velocity. The buffer may store variable transport delays associated with a model, or may store information used to calculate variable transport delays, as described in more detail herein.

The variable transport delay may be associated with a dynamic system represented in a model by one or more differential equations. The variable transport delay may be determined by identifying an initial time at which the input data point starts and an ending time at which the input data point ends, and calculating an instantaneous time delay using the initial time, the ending time and the input data point. The instantaneous time delay may be integrated, and the integrated instantaneous time delay may be assigned as the variable transport delay.

The buffer may have a capacity that defines the maximum number or size of input data points that the buffer is capable of holding. The buffer may further have a data density that represents an average distance between indices of adjacent input data points in (for example) a temporal or physical space. For example, the data density may represent an average distance between indices of adjacent input data points. In one embodiment, each index is associated with a time at which a respective data point was collected, and the distance between the indices of the input data points is a temporal distance.

The buffer may be operated on to identify that the buffer is at or near the capacity of the buffer. When the buffer is at or near the capacity, a rule may be applied to the buffer. Applying the rule may result in downsampling of the input data and reduction of the data density of the buffer.

For example, the rule may involve removing every $k^{th}$ input data point, where k is a positive integer. Alternatively, data in the buffer may be requested by a requesting entity, and the rule may involve removing a least-used data point that is the subject of the least requests from the requesting entity, or removing a least-used data point that is the subject of a least cumulative number of requests from a plurality of requesting entities.

After the data in the buffer has been downsampled (and therefore some of the data points have been removed from the buffer), it is possible that a request will be received at the buffer to retrieve a requested data point that is no longer stored in the buffer. In this situation a requested data point may be retrieved by interpolating between two of the input data points that are stored in the buffer. The requested data point may be returned in response to the request.

Using the above-described techniques, storage space can be freed in a buffer so that additional data may be added to the buffer. However, the data is removed in such a way (i.e., by reducing the data density of the buffer rather than simply removing data from the front or back of the buffer) that the removed data can still be interpolated from the data remaining in the buffer.

BRIEF DESCRIPTION OF THE DRAWINGS

The present invention will become better understood with reference to the following description and accompanying drawings, wherein.

DETAILED DESCRIPTION

Exemplary embodiments provide methods, systems, and electronic media for managing data in a buffer by downsampling input buffer data to reduce the data density of the buffer. The buffer may hold a plurality of input data points associated with an index. The buffer may be associated with a data density that represents a logical distance between indices of adjacent input data points. That is, the data density represents a difference between element indexes for the data elements in the buffer. If the data elements are indexed by time, for example, then the data density may represent the average temporal distance between data elements that occur in temporal succession to each other. If the data elements are indexed by position, the data density may represent an average spatial distance between data elements that are located next to each other.

The buffer is also associated with a capacity. When the buffer is at or near the capacity, a rule may be applied to the data buffer. Application of the rule may downsample the input data and reduce the data density of the buffer. Removed data points may be retrieved by deriving the removed data points from data points that remain in the buffer.

Thus, rather than simply removing data points from the front of the buffer, intermediate data points may be removed so that the data density of the buffer is reduced, allowing the remaining values in the buffer to be spread out. That is, the element indexes of the elements in the buffer are more sparse or less dense after the data points are removed than before the data points are removed. The removed data points may then be extrapolated from the information stored in the buffer by deriving/interpolating the removed data points from the existing data points.

The ability to reduce the data density of the buffer (while still being capable of interpolating removed data points) may be particularly useful in the context of the modeling of physical systems involving the calculation of transport delays, because transport delays are often stored in buffers and are particularly amenable to interpolation.

More specifically, the modeling of physical systems oftentimes requires the modeling of transport delays inherent in these physical systems. Models of physical systems that use transport delays include models of transportation systems, airports, or conveyor belt arrangements. These transport delays may be best viewed as the time required for a material to go through a buffer of know size at a known speed. The simplest forms of transport delays are exhibited by a constant delay assigned to a signal which results in the delivery of the input signal at a fixed time in the future. In situations where the speed of material transfer through the buffer is constant, a variable time delay may be computed.

A variable time delay is best exhibited by example. A common instance of variable time delay is seen in the flow of an incompressible fluid through a pipe with an output located at length L distance away from the input. This length L can be best understood as a buffer between input and output. In such a setting, there will be a time delay $t_d$ determined by the length of the transportation and the speed of the transportation. To simplify the example, it is assumed that the speed of the transportation (i.e. the fill rate of the buffer) at the inlet of the pipe is $v_i(t)$ and the speed at the outlet is $v_o(t)$. For further simplification, it will be assumed that $v_i(t)$ and $v_o(t)$ are equal, as the fluid traversing the length L is incompressible. Further associated with the present example are input $u_i$ and output $u_o$ which denote specific properties of the transported material, such as temperature at the inlet and outlet. Generally speaking, the relationship of $u_i$ to $u_o$ can be defined such that $u_o$ is a delayed $u_i$ and the delay is caused by the transportation. Representing this as an equation yields $u_o=u_i(t-t_d)$.

To determine a variable time delay, it is necessary to solve for $t_d$ based on the transport speed $v_i$ and the length L of the pipe. If the conservation variable at the inlet of the pipe is defined as $L_i(t)=\int_{t_0}^{t}v_i(\tau)d\tau$ and the conservation variable at outlet of the pipe is defined as $L_o(t)\int_{t_0}^{t}v_o(\tau)d\tau$ then $L_i(t)-L_o(t)=L$.

Additionally, as $L_o(t)=L_i(t-t_d)$, it is therefore evident that:

$$v_i(t)=v_o(t)$$

$$L_i(t)-L_i(t-t_d)=L.$$

Note, however, that the delay set forth above is only constant if the velocity is constant, making it only possible to study velocity related properties or the conservation variable at the inlet and the outlet using the above equation.

In many modern systems, however, such a constant velocity is not applicable. For example, fluid flow velocity through the aforementioned pipe may be increased by the addition of a variable speed pump, such that velocity of the fluid is no longer constant. In view of this, a need to study some other property associated with the system at the input and output of the system is required. Namely, a need to determine a variable transport delay wherein the variables are not bound by existing assumptions is required to more accurately model dynamic systems.

FIGS. 1 through 6, wherein like parts are designated by like reference numerals throughout, illustrate an example embodiment of a variable transport delay according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 1:
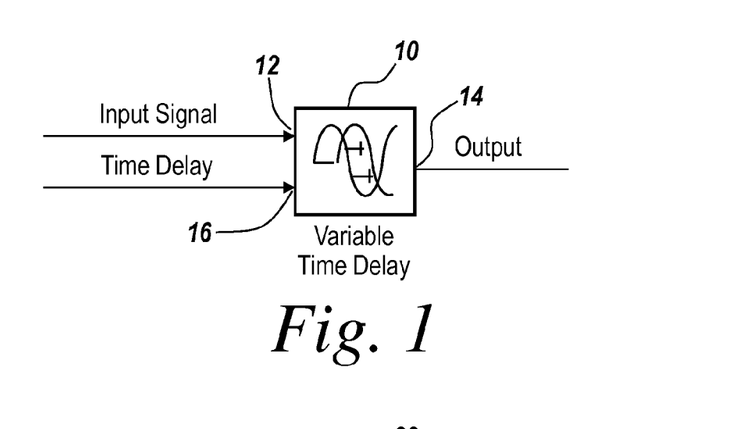
FIG. 1 is an exemplary variable time delay block as understood within the prior art.

FIG. 1 depicts a conventional variable time delay block 10 as understood in the prior art. This variable time delay block 10 can be used in conjunction with a graphical modeling environment, such as the Simulink® block diagram environment offered by The MathWorks, Inc. of Natick, Mass. One skilled in the art will readily recognize that the time delay block of the present invention may be utilized within numerous alternative block diagram modeling environments. The Variable time delay block 10 includes an input port 12 and an output port 14. A signal provided to the input port 12 is delayed by a specific time prior to delivery to the output port 14. This delay time 16 is user configurable. When used within a block diagram modeling environment, at the start of the simulation, the block outputs the input signal parameter provided to the input port 12 until the simulation time exceeds the preconfigured time delay parameter 16, when the block begins generating the delayed input. The time delay parameter must be nonnegative.

This conventional time delay stores input points and simulation times during a simulation in a buffer whose initial size is user defined. When used within a Simulink® environment, should the number of points exceed the buffer size, the block allocates additional memory and Simulink® displays a message after the simulation that indicates the total buffer size needed. Because allocating memory slows down the simulation, this parameter value must be defined carefully if simulation speed is an issue. For long time delays, this block might use a large amount of memory, particularly for a dimensionalized input.

When output is required at a time that does not correspond to the times of the stored input values, the block interpolates linearly between points. When the delay is smaller than the step size, the block extrapolates from the last output point, which can produce inaccurate results. Because the block does not have direct feedthrough, it cannot use the current input to calculate its output value. Such a situation is best illustrated by example. Consider a fixed-step simulation with a step size of 1 and the current time at t=5. If the delay is 0.5, the block needs to generate a point at t=4.5. Because the most recent stored time value is at t=4, the block performs forward extrapolation.

Figure 2:
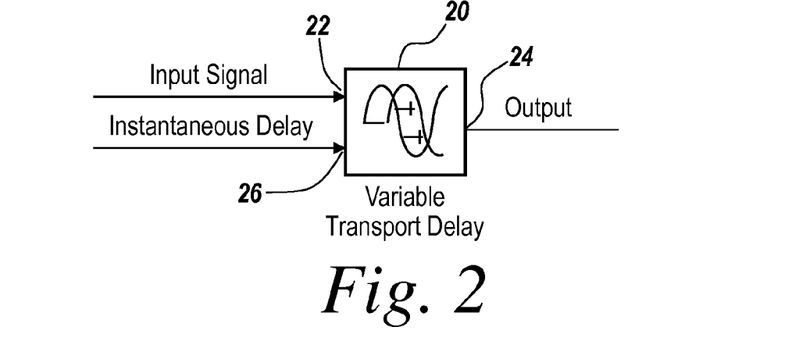
FIG. 2 is an exemplary variable transport delay block in accordance with one aspect of the present invention.

FIG. 2 is an illustrative example of the variable transport delay 20 of an embodiment of the present invention, which is used within a graphical block diagram environment, such as Simulink®. One skilled in the art will recognize that the variable transport delay of the present invention does not need to be used exclusively within a block diagram modeling environment. The illustration of a block for use within a block diagram modeling environment is solely for illustrative purposes and is not intended to be limiting in scope. The variable transport delay 20 of the present invention includes an input 22 capable of receiving an input signal, and an output 24 capable of delivering an output signal to the modeling environment. Further associated with the variable transport delay block 20 is an instantaneous delay signal 26. This instantaneous delay signal can be viewed as an estimated time of arrival, and is best understood by example.

Figure 8:
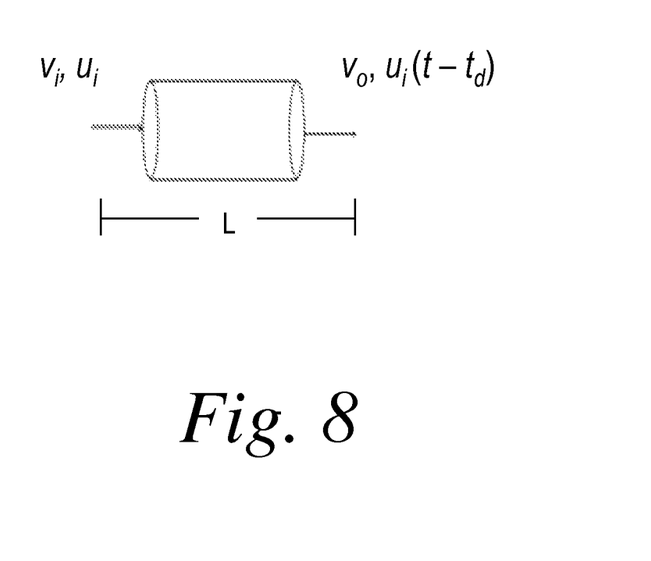
FIG. 8 is an exemplary pipe for illustration purposes.

Given an exemplary pipe of length L, with initial input parameters $v_i$, $u_i$ and output parameters $v_o, u_i(t-t_d)$, as illustrated in FIG. 8, applying conservation principles yields:

$$L = \int_{t-td}^{t} v_i(\tau) d\tau \quad \text{(Equation 1)}$$

Normalizing Equation 1 by dividing by L further yields:

$$1 = \int_{t-td}^{t} \frac{v_i(\tau)}{L} d\tau = \int_{t-td}^{t} \frac{\frac{1}{L}}{v_i(t)} d\tau \quad \text{(Equation 2)}$$

wherein:

$$\frac{L}{v_i(t)} = T_D$$

such that $T_D$ is called instantaneous delay or can be understood as estimated time of arrival. In view of this, Equation 2 can be rewritten as:

$$1 = \int_{t-td}^{t} \frac{1}{T_D} d\tau \quad \text{(Equation 2')}$$

The use of a pipe with an incompressible flow is solely for illustrative purposes and as such not intended to be limiting on scope of the present invention. For example, the variable transport delay generated in accordance with the present invention may be used in modeling conveyor belt delivery or products, automotive applications and traffic flow, for example.

Figure 3:
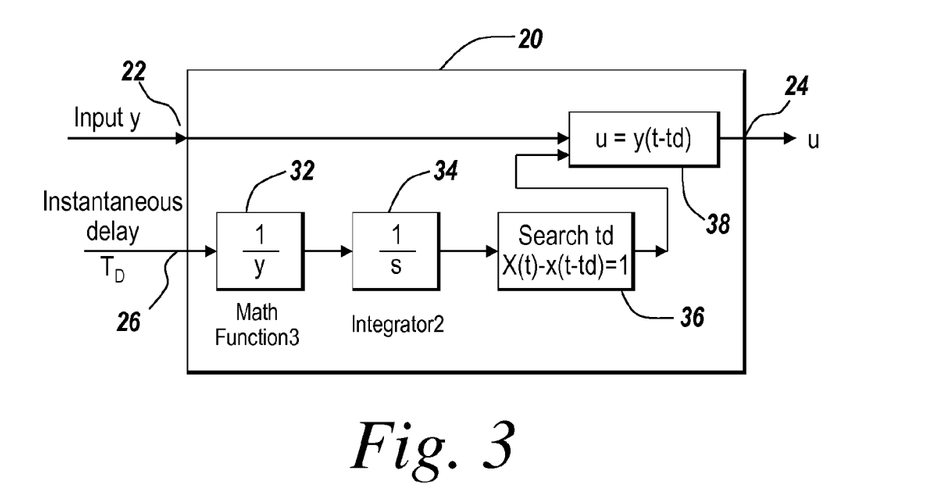
FIG. 3 is a sample of the internal processing arrangement of the sample variable transport delay block of the present invention.

FIG. 3 is an illustrative example of the Variable Transport Delay 20 block of FIG. 2, wherein illustrative internal steps of a sample Variable Transport Delay block 20 are illustrated for use in determining an output 24 that is delayed. These steps serve to illustrate a sample variable transport delay block and are not exclusive to the operation of a variable transport delay block used to generate a variable transport delay. One skilled in the art will readily recognize that numerous alternative means exist by which a variable transport delay is ultimately calculated.

To calculate a real time delay $t_d$ in accordance with the illustrative embodiment the integration equation 2' must first be solved. Following this step, $u(t-t_d)$ can then be solved. In the illustrative embodiment, the instantaneous delay $T_D$ is first inverted by the inversion element 32, yielding $$\frac{1}{T_D}.$$

The output of the inversion element 32 is passed to an integrator 34. This integrator may take numerous forms, as understood by one skilled in the art. For example, in one embodiment the integration equation 2' can be solved using a stacked buffer of input u,t and the integration of $$\frac{1}{T_D}.$$

The output equation 38 $y=u(t-t_d)$, where $t_d$ is determined by equation (2'), such that a variable transport delay output 24 is generated. This variable transport delay can be used in conjunction with a graphical block diagram modeling environment to simulate various dynamic systems exhibiting non-uniform delay characteristics.

Figure 4:
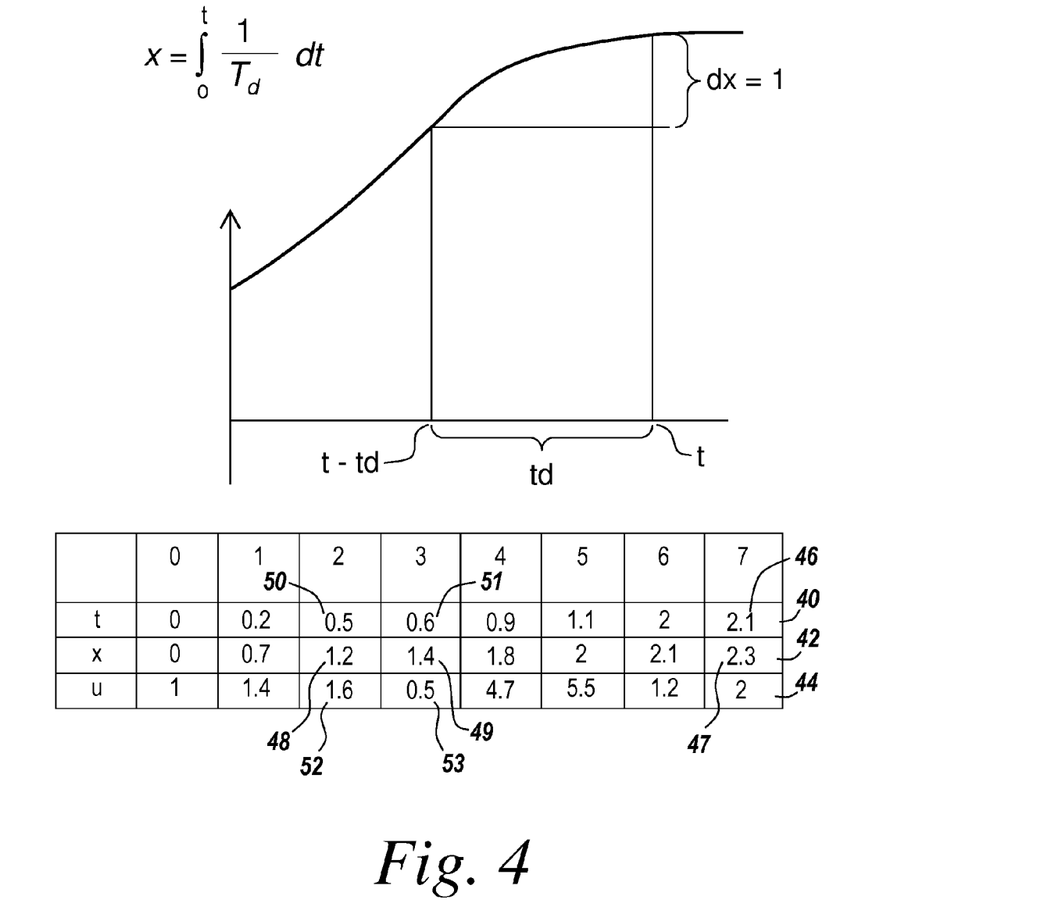
FIG. 4 is a graphical depiction of the integration process utilized in calculating a variable transport delay according to one aspect of the present invention.

FIG. 4 is an illustrative method for solving the output equation 38 using a lookup table arrangement. This illustrative method is not exclusive of the lookup table arrangement which may be employed with the current application. Numerous computation means, as understood by one skilled in the art, may be employed for use in calculating the value of:

$$1 = \int_{t-td}^{t} \frac{1}{T_D} d\tau \quad \text{(Equation 2')}$$

set forth prior. In the present embodiment, as illustrated in FIG. 4, the time vector t is initially stored. As illustrated, the time vector t is stored in row 40, wherein each column represents a different time step. In the present illustration the time step between columns is uniform, yet the present application may be practiced with non-uniform time steps.

Following the storage of the time vector t, x is calculated using the integration of:

$$\frac{1}{T_D}d\tau$$

wherein $$x = \int_0^t \frac{1}{T_d}dt.$$

Further note that $$T_D = \frac{L}{v_i(t)}.$$

The value of x is then stored in row 42 of the lookup table at a variety of time steps, each designating an individual column. Additionally, the input value of u(t) is further stored in an individual row (row 44).

To determine the output of the variable transport block, it is necessary to determine a time at which this output is required. For example, should the output be required at a time of t=2.1 seconds 46 (i.e. the 7$^{th}$ time interval) an attempt at calculating $t_d$ will occur. As the value of:

x(7)47−x(2)48=2.3−1.2=1.1>1 and x(7)47−x(3)48=2.3−1.4=0.9<1 it is clear that:

t(2)50<t−td<t(3)→

0.5<t−td<0.6.

Using the method of interpolation it can be determined that t−td=0.55. This interpolation information can further be used to find u(0.55). As u(0.5)=1.6 (52) and u (0.6)=0.5 (53) the value of u(0.55) can be interpolated. This output may then be passed to a graphical block diagram modeling environment for use in further simulation.

One skilled in the art will readily recognize that the use of a lookup table arrangement is not the exclusive means by which the present invention may be practiced. One skilled in the art will note that numerous alternative means to calculate the integration result can be employed. Such means include, but are not limited to conversion of solving an integration equation, as set forth above, to the solving of a differential equation. For example, the conservation variable of the inlet of the aforementioned pipe can be defined as:

$L_i(t) = \int_{t_0}^t v_i(\tau)d\tau$ while the conservation variable of the outlet can be defined as:

$L_o(t) = \int_{t_0}^t v_o(\tau)d\tau$

In view of this, $L_i(t) − L_o(t) = L$, and $L_o(t) = L_i(t−t_d)$, therefore:

$v_i(t) = v_o(t)$ $L_i(t) − L_i(t−t_d) = L$     (Equation 3)

Following the differentiation of Equation (3) with respect to t yields:

$$v_i(t) - v_i(t - t_d)\left(1 - \frac{dt_d}{dt}\right) = 0 \quad \text{(Equation 4)}$$

$$\frac{dt_d}{dt} = 1 - \frac{v_i(t)}{v_i(t - t_d)} \quad \text{(Equation 5)}$$

Wherein $v_i$ is the transport speed.

In view of the above, the aforementioned Equation 2 has been converted into a differential equation, as illustrated in Equation 5, which may be solved using known computation techniques. For example, the Simulink variable time block can be used to solve the differential equation of Equation 5.

Figure 5:
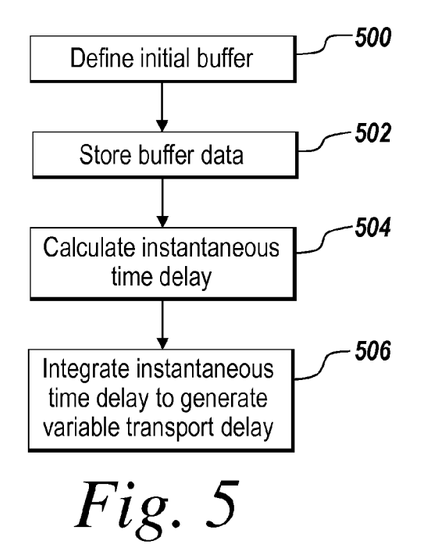
FIG. 5 is a flowchart of the steps required in generating a variable transport delay according to one aspect of the present invention.

FIG. 5 is a flowchart illustrating the steps necessary in practicing one embodiment of the present invention. As illustrated in step 500, an initial buffer is first defined. This buffer is capable of storing buffer data, starting at an initial time and ending at a final time, in accordance with step 502. Data stored by this buffer may take numerous forms and may include, but is not limited to, velocity, acceleration data or mass flow data. In view of the flow of fluid through a pipe example, set forth prior, initial and final buffer data may be input and output velocity data. Following the collection and storage of buffer data an instantaneous time delay is computed in accordance with step 504. This instantaneous time delay may be viewed as an estimated time of arrival as a material traverses a length beginning at an input and ending at an output. As set forth earlier, in view of the incompressible flow through a pipe example, the instantaneous delay $$T_D = \frac{L}{v_i(t)}.$$

The calculation of instantaneous delay may occur using various means, including but not limited to computer based solutions. Following calculation of instantaneous delay in accordance with step 504 the instantaneous delay is integrated to generate a variable transport delay 506. Integration of this instantaneous delay can occur using computer based integration means, such as interpolation using a lookup table, or may occur following the conversion of the integral into a differential equation.

Figure 6:
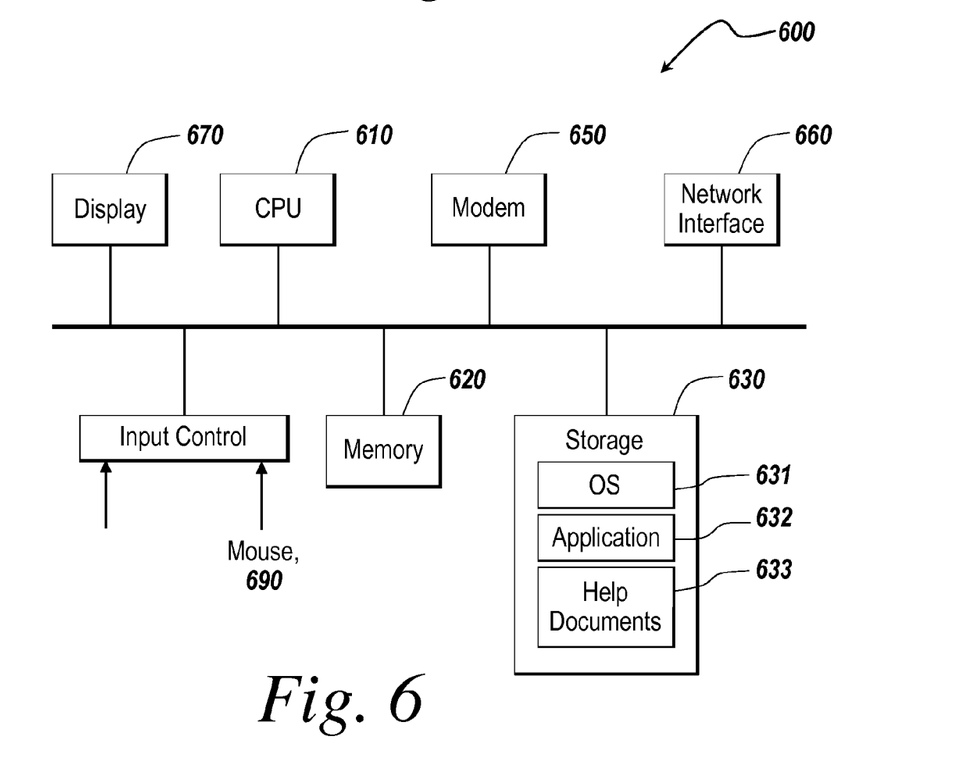
FIG. 6 is an illustrative embodiment of a computing systems used in practicing one aspect of the present invention.

FIG. 6 is an exemplary computing device 600 suitable for practicing the illustrative embodiment of the present invention, which provides a block diagram environment. One of ordinary skill in the art will appreciate that the computing device 600 is intended to be illustrative and not limiting of the present invention. The computing device 600 may take many forms, including but not limited to a workstation, server, network computer, quantum computer, optical computer, bio computer, Internet appliance, mobile device, a pager, a tablet computer, and the like.

The computing device 600 may be electronic and include a Central Processing Unit (CPU) 610, memory 620, storage 630, an input control 640, a modem 650, a network interface 660, a display 670, etc. The CPU 610 controls each component of the computing device 600 to provide the block diagram environment and to apply a coding standard to a block diagram in the block diagram environment. The memory 620 temporarily stores instructions and data and provides them to the CPU 610 so that the CPU 610 operates the computing device 600 and runs the block diagram environment. The storage 630 usually contains software tools for applications. The storage 630 includes, in particular, code 631 for the operating system (OS) of the device 600, code 632 for applications running on the operation system including applications for providing the block diagram environment, and data 633 for block diagrams created in the block diagram environment and for one or more coding standards applied to the block diagrams.

The input control 640 may interface with a keyboard 680, a mouse 690, and other input devices. The computing device 600 may receive through the input control 640 input data necessary for creating block diagrams, such as the selection of the attributes and operations of component blocks in the block diagrams. The computing device 600 may also receive input data for applying a coding standard to a block diagram, such as data for selecting the coding standard, data for customizing the coding standard, data for correcting the violation of the coding standard in the block diagram, etc. The computing device 600 may display in the display 670 user interfaces for the users to edit the block diagrams. The computing device 600 may also display other user interfaces, such as a user interface for selecting a modeling standard, a user interface for customizing the modeling standard, a user interface for displaying a corrected block diagram that removes the violation of the modeling standard, etc.

Figure 7A:
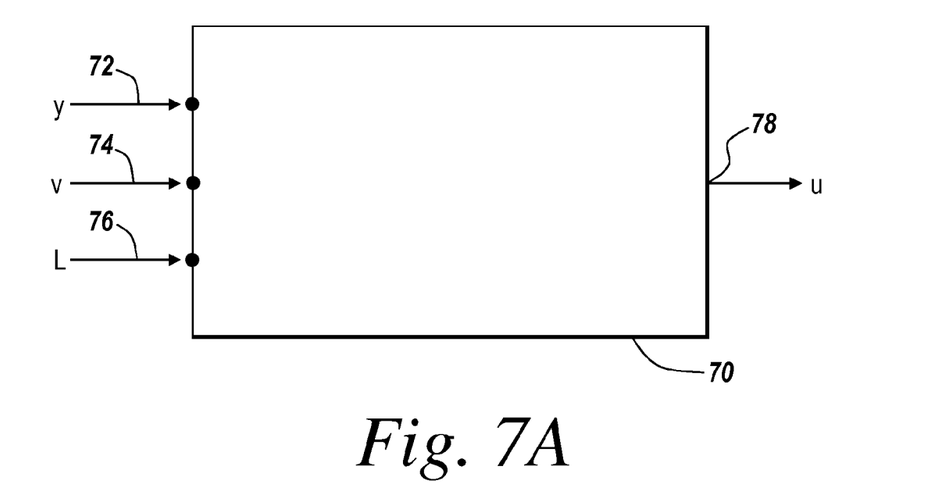
FIG. 7A is an exemplary variable transport delay block in accordance with one aspect of the present invention

FIG. 7A is an embodiment of a variable transport delay block for use in settings wherein the aforementioned parameter "L" is variable, as opposed to a constant value which was assumed for the prior analysis.

In a setting of a non constant "L" parameter, the variable transport delay block includes three input which are used to generate a single output. In the present embodiment, as illustrated in FIG. 7A, an input signal "y" 72, a velocity variable "v" 74 and a length variable "L" 76 are each provided to the variable transport delay block 70.

If the length of the transportation (i.e the length of the pipe in the prior example) is also a time varying variable, noted as L(t), then the equation governing the transportation can be expressed as:

$$L(t) = \int_{t-t_d}^{t} v(\tau) d\tau \qquad \text{Equation 6}$$

wherein the speed of the transportation is denoted as v(t) and the delay time $t_d$ is the delay time parameter needed.

In such a situation where "L" is variable, it is no longer possible to normalize the above equation in accordance with the methods used in the prior illustrative embodiment. Normalization of the above equation is exhibited in Equation 2 of the alternate embodiment wherein:

$$1 = \int_{t-td}^{t} \frac{v_i(\tau)}{L} d\tau = \int_{t-td}^{t} \frac{\frac{1}{L}}{v_i(t)} d\tau$$

Absent the normalization process employed in a setting wherein the "L" parameter is constant, Equation 6 of the present embodiment may be solved using a similar method wherein buffer data is stored for use in interpolation of a final result. The storage of buffer data in accordance with the present embodiment requires the storage of two data sets of buffer data, namely velocity v(t) and Length L(t) data. Rewriting equation 6 yields:

$$L(t) - \int_{t-t_d}^{t} v(\tau) d\tau = 0$$

wherein the solution to:

$$L(t) - \int_{t_k}^{t} v(\tau) d\tau < 0$$

and $$L(t) - \int_{t_{k+1}}^{t} v(\tau) d\tau > 0$$

can be found. In view of this, $$t_k < t - t_d < t_{k+1}$$

Figure 7B:
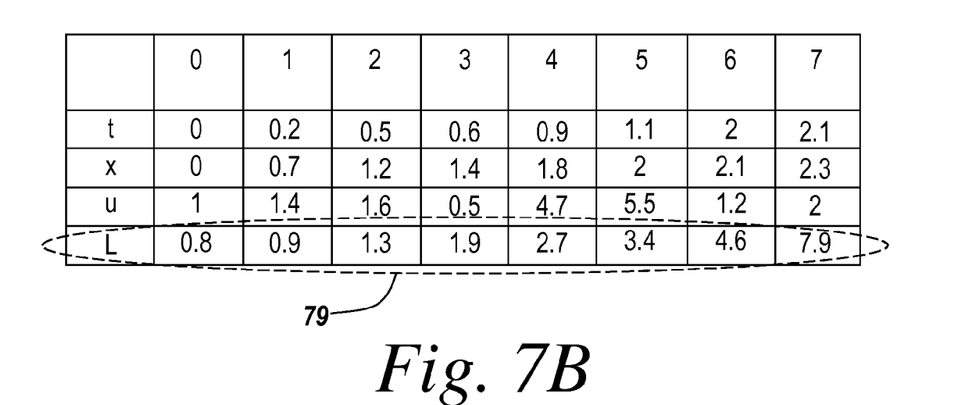
FIG. 7B is an exemplary lookup table dataset for use with an embodiment of the present invention.

Using an interpolation approach, in accordance with the setting wherein "L" is constant, the value of $t-t_d$ can be determined. This interpolation will require the storage of an additional variable, namely L(t) for use in the interpolation of $t-t_d$. An illustrative lookup table including the variable L and the value of L at variable times 79 is illustrated in FIG. 7B. Upon calculating this value, the output "u" 78 of the variable transport delay block can be calculated in accordance with the equation:

$$u = y(t - t_d).$$

This output 78 may be delivered to a graphical block diagram model environment for use in subsequent calculation as understood by one skilled in the art.

One skilled in the art will recognize that the illustrative embodiment may take numerous alternative forms, for example a situation where L is a parameter associated with the variable transport delay block as opposed to the explicit input illustrated in FIG. 7B. By defining L as a parameter in the an embodiment numerous pieces of information may be further associated with the parameter. For example, not only the value of a parameter may be specified, but also other information about the parameter, such as the parameter's purpose, its dimensions, its minimum and maximum values, etc.

Figure 9:
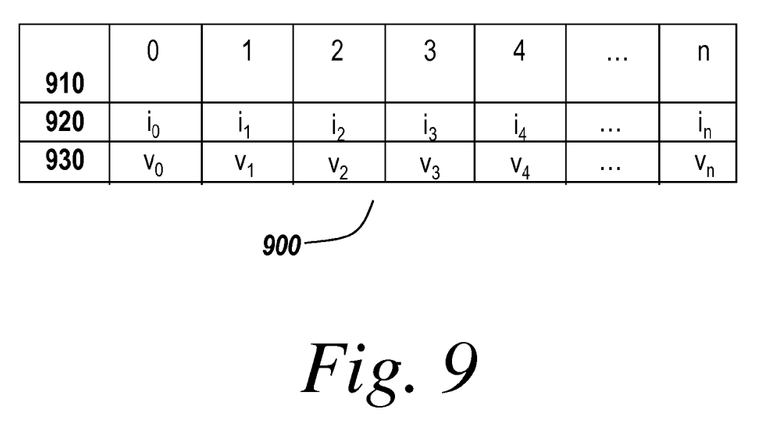
FIG. 9 depicts an exemplary buffer 900 suitable for use with exemplary embodiments described herein.

More generally, the above-described values may be stored in a buffer, such as the buffer 900 of FIG. 9. The buffer 900 may be, for example, an array, matrix, or linked list.

The buffer 900 is merely exemplary. More or fewer values and/or fields may be stored in the buffer 900 than are illustrated in FIG. 9. The buffer 900 may take any form suitable for storing a plurality of data values and/or associated indices for the data values.

The buffer 900 may include a field for the buffer index 910 of each of the data elements stored in the buffer. For example, the buffer 900 may use zero based indexing, wherein the index of the $i^{th}$ element in the buffer is i−1 (for example, the $1^{st}$ data element in the buffer is at buffer index 0). One of ordinary skill in the art will understand that the buffer index 910 need not be explicitly stored in the buffer 900 for each (or any) data element. Rather, if the size s (in bytes) of the data elements in the buffer is known, then the $i^{th}$ data element in the buffer 900 may be found by starting from the beginning of the buffer 900 and moving into the buffer by (i−1)*s bytes.

The buffer 900 may further include a field that represents an element index 920 for a data element in the buffer. The element index 920 may be, for example, a temporal, spatial, or logical specification of the data element (e.g., a time or a location at which the data element was acquired). The element index 920 is separate from the buffer index 910. Whereas the buffer index 910 represents the position of a particular data element in the buffer, the element index 920 may represent the position of a data element with respect to other data elements.

For example, if the data elements represent data obtained at certain time points, then the first data element may be obtained at time t=0.1 and may be assigned to buffer index 0. The second data element may be obtained at time t=0.4 and may be assigned to buffer index 1. In this example, the first data element has a buffer index 910 of 0, and an element index 920 of 0.1. The second data element has a buffer index 910 of 1, and an element index 920 of 0.4.

Furthermore, the buffer 900 may include a field that represents a data value 930 for a data element in the buffer. The data value 930 may represent a data value obtained at the temporal, spatial, or logical location identified by the element index 920.

For example, if the buffer 900 holds the responses of a model obtained by simulating the model at various times t, then the element index 920 may represent a time $t_i$ at which a certain data point is collected. The data value 930 may represent a response $v_i$ of the model obtained at the time $t_i$.

In another embodiment, the data value 930 may represent a variable transport delay representative of delayed data provided to the buffer. The variable transport delay may be used by a dynamic system represented in a model by one or more differential equations. As described in more detail above, variable transport delay represents an amount of delay incurred when something, such as a physical object or data, transits a certain physical or logical distance at a non-constant velocity. The variable transport delay may be determined by identifying an initial time at which one of the input data points starts and an ending time at which the one of the input data points ends, and calculating an instantaneous time delay using the initial time, the ending time and the input data point. The instantaneous time delay may be integrated, and the integrated instantaneous time delay may be assigned as the variable transport delay.

A buffer, such as the buffer 900, typically has a finite capacity. For example, the buffer 900 includes storage space for a number n of data elements, where n is the capacity of the buffer in terms of storable units (i.e., data elements). The data elements may be, for example, individual values such as integers or floating point numbers. The data elements also may be data structures representing combinations of values, such as arrays or matrixes (as shown, for example, in FIG. 7B). The buffer 900 may be associated with a total capacity that is dependent on the size of the data elements contained in the buffer. For example, if the size allocated to each data element in the buffer is represented by s, then the total capacity of the buffer 900 (in terms of bytes) may be thought of as n*s.

In some situations, there may be more data to store than can be stored together in the buffer 900. This is particularly common in the case of a model simulation where the number of data points that will eventually be collected over the course of the simulation is not known when the buffer 900 is initialized. If the buffer 900 is requested to store move values than can fit in the buffer, then according to exemplary embodiments described below, the buffer may be "downsampled." Downsampling the buffer 900 may involve reducing a data density of the buffer 900 by removing data values from the buffer 900, such as intermediate data values (i.e., data values that are between the first and last data value in the buffer). Alternatively or in addition to the above, the first and/or last data value may be removed. The data density of the buffer may be thought of as the average distance between adjacent element indexes 920 of the elements in the buffer.

For example, assume that data is gathered once per second and stored in the buffer. That is, the first data point is associated with a time $t_0=0:01$. The second data point is associated with a time $t_1=0:02$, and so on. The average distance between the times in this sequence is 1 second (this value being the average distance between adjacent element indexes 920 in the buffer).

In a second example, assume that:
the first data point is associated with a time $t_0=0:01$,
the second data point is associated with a time $t_1=0:05$,
the third data point is associated with a time $t_2=0:07$, and
the fourth data point is associated with a time $t_3=0:11$.

The distance between the first element index 920 and the second element index 920 is 4 seconds. The distance between the second element index and the third element index is 2 seconds. The distance between the third element index and the fourth element index is 4 seconds. Accordingly, the average distance between the times in this example is 3.333 seconds (the average of 4 seconds, 2 seconds, and 4 seconds). Thus, the data density is greater in the first example than the second example (a lower average distance between value is associated with a greater data density, since the data is packed together more closely in the first example than the second example).

When the buffer 900 is downsampled according to exemplary embodiments described herein, the data density of the buffer 900 is reduced. For example, consider the situation where, in the second example above, the second data point is removed. Now, the first data point is associated with a time $t_0=0:01$, the (new) second data point is associated with a time $t_1=0:07$, and the (new) third data point is associated with a time $t_3=0:11$. In this case, the average distance changes from the original 3.333 seconds to 5 seconds (the average of 6 seconds and 4 seconds). It should be noted that reducing the data density of the buffer 900 increases the average distance between adjacent element indexes 920 in the buffer 900 because the data points are now further from each other, on average, and are therefore less "dense" in the buffer 900.

Downsampling the buffer 900 to reduce the data density of the buffer may be employed when the buffer is at or near the buffer's maximum capacity. This may provide more room in the buffer 900 to store additional data elements.

Figure 10:
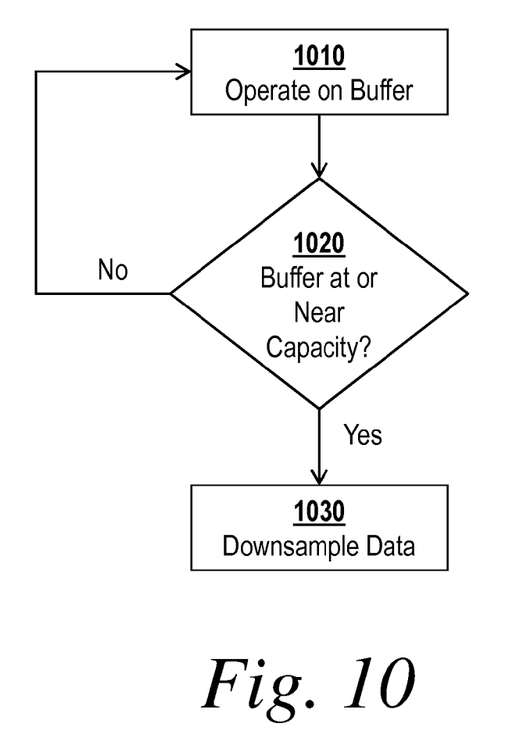
FIG. 10 is a flowchart depicting an exemplary method for removing data elements from the buffer 900.

FIG. 10 depicts an exemplary procedure for removing data elements from the buffer 900. At step 1010, the buffer may be operated upon in some manner. For example, a request may be made to store or retrieve data from the buffer. It should be noted that downsampling may occur during an operation on the buffer, or may occur before or after the operation takes place.

At step 1020, it may be determined if the buffer is at or near capacity. The buffer is at capacity when the buffer is capable of storing n data elements and the buffer currently stores n data elements. The buffer is considered near capacity when the buffer approaches the capacity and is within a predetermined threshold range of the capacity. For example, if the threshold range is m data elements, then the buffer may be considered near capacity when the buffer currently stores n-m data elements.

In some embodiments, whether the buffer is at or near capacity may be determined by consulting a counter variable. The counter variable is initialized at 0 and is incremented each time data is written to the buffer. When counter attains the value of n (in the case of an at-capacity buffer) or n-m (in the case of a near-capacity buffer), the buffer is determined to be at or near capacity. If the buffer is downsampled as described below with respect to step 1030, the counter variable may be decremented once for each value removed from the buffer. Thus, the counter variable always reflects the number of data elements currently stored in the buffer.

At step 1030 (if the buffer is determined to be at or near capacity), the buffer may be downsampled to reduce the data density of the buffer. In one example, every $k^{th}$ data element may be removed from the buffer, where k is an integer. For example, every other (k=2) or every third (k=3) value may be removed from the buffer. This removal procedure serves to decrease the data density of the buffer while removing some of the values from the buffer. Thus, additional storage capacity in the buffer is freed for use. The entire buffer could be downsampled, or only a portion of the buffer may be downsampled while the remainder of the buffer is left untouched. This may be useful, for example, if relatively recent data values in the buffer are to be left intact while some or all older data values in the buffer can be removed.

As noted above, downsampling of the buffer may be triggered when the buffer is at or near capacity. However, downsampling may be triggered under other conditions as well, such as at predetermined points in time during the modeling process. Furthermore, the downsampling may be triggered dynamically (e.g., different triggering events may trigger the downsampling through the course of a simulation, as in the case where a different value for m is applied at different points in the simulation).

An example of the downsampling process is described in more detail with respect to an example as set forth in FIGS. 11A-11E.

Figure 11A:
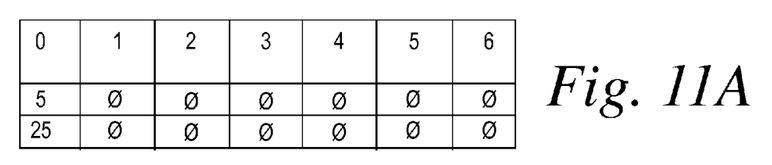
FIGS. 11A–11E depict an exemplary buffer as data is added to the buffer and as the buffer is downsampled.

In FIG. 11A, an empty buffer is provided. The buffer has seven buffer indices labeled zero through six. Each buffer index holds a data element associated with an element index and an element value. For example, FIG. 11A depicts the buffer after a single data element has been added at buffer index 0. The first data element has an element index of 5 and a value of 25. This may signify, for example, that an output value of "25" was generated from a model at time 5.

The remaining six slots of the buffer have not yet been filled. Thus, the slots are indicated using the null ($\phi$) symbol.

Figure 11B:
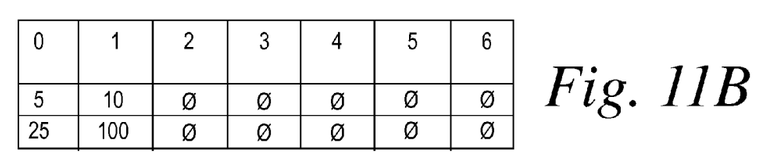

In FIG. 11B, a second data element has been added to the buffer. The second data element is stored at buffer index 1 and is associated with an element index of 10 and an element value of 100. This may indicate, for example, that a value of 100 was generated by the model at time 10. The average distance between element indexes in FIG. 11B is 5, because only two values are present in the buffer, and the element indexes of the elements are separated from each other by 5.

Figure 11C:
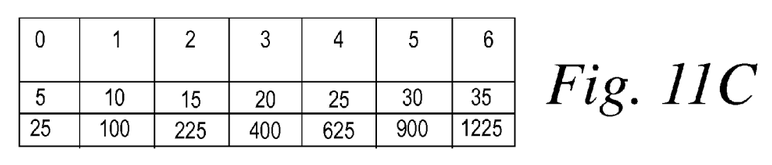

FIG. 11C depicts the buffer after seven data elements have been added. Because the buffer is capable of storing only seven elements, the buffer is now at capacity. In FIG. 11C, the average distance between element indexes is 5 because the average difference between adjacent data elements is 5. Thus, the data density of FIG. 11C is the equivalent to the data density in FIG. 11B.

When the buffer reaches capacity as shown in FIG. 11C, the buffer may be downsampled to reduce the data density of the buffer. For example, as described above with respect to FIG. 10, every $k^{th}$ data element may be removed from the buffer. One exemplary downsampled buffer that results when the buffer of FIG. 11C is downsampled by removing every $2^{nd}$ data element (k=2) is shown in FIG. 11D.

Figure 11D:
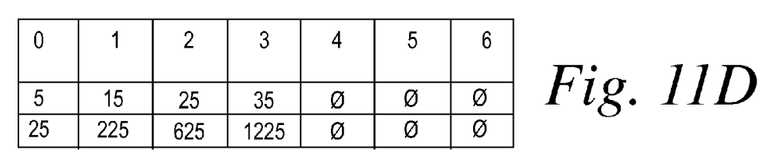

In FIG. 11D, every $2^{nd}$ data element has been removed from the buffer of FIG. 11C. Accordingly, intermediate data elements having the element indexes 10, 20, and 30 have been removed. As a result, the data density has been reduced because the average distance between adjacent element indexes in FIG. 11D is now 10 (whereas the average distance of FIG. 11C was 5). Thus, the data density of FIG. 11D is less than the data density of FIG. 11C.

It should be noted that it is not necessary to place the newly-freed empty buffer spaces at the end of the buffer. Rather, the buffer slots from the data elements that were eliminated from the buffer may be left blank and may be filled with new data elements as the new elements are added to the buffer. In this embodiment, the element indexes of the data elements may be out-of-order in the buffer. However, when determining the data density, the average value of adjacent element indexes should be used. The buffer may either be rearranged in order or searched to determine which element indexes are adjacent to each other. So, for example, if the buffer includes the out-of-order element indexes "1-5-3-7," the average distance is 2 because the distance from each element to each adjacent element (i.e., from 1 to 3, from 3 to 5, and from 5 to 7) is 2.

Figure 11E:
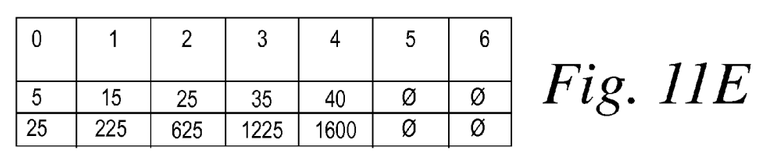

As a result of downsampling the data, the buffer of FIG. 11D has freed three empty data slots, at buffer indexes 4, 5, and 6. Accordingly, additional data may be stored in the buffer, as shown in FIG. 11E. In the buffer of FIG. 11E, a new data point having an element index of 40 has been added at buffer index 4. The average distance between adjacent element indexes in FIG. 11E is now 8.75, and hence the data density has increased from FIG. 11D to FIG. 11E. This is an acceptable increase, since the data density must only decrease at the time that the buffer is downsampled.

Data may be requested from the buffer before or after the buffer is downsampled. In some cases, the data will be present in the buffer but in others the data will have been removed during the downsampling process. However, the removed data values may still be estimated by interpolating between data values that still exist in the buffer, as described below with respect to FIG. 12.

Figure 12:
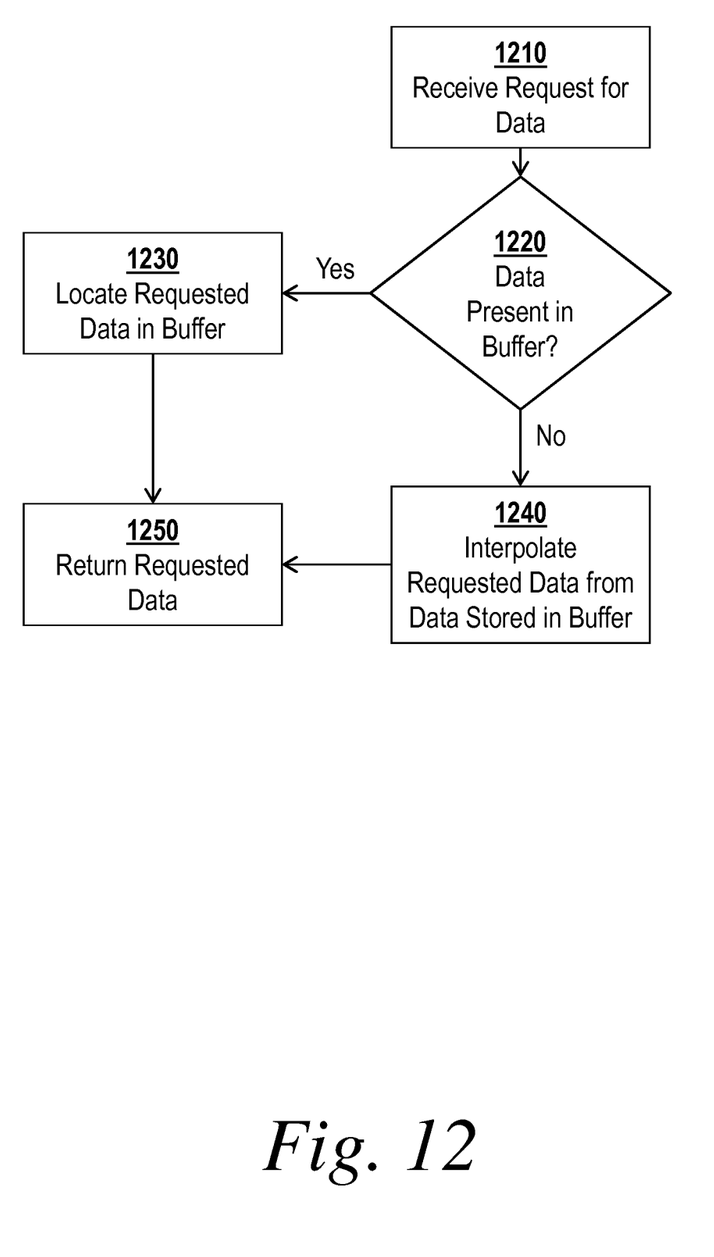
FIG. 12 is a flowchart depicting an exemplary procedure for returning requested data to a requestor.

FIG. 12 is a flowchart depicting an exemplary procedure for returning a requested value to a requestor. At step 1210, a request for data may be received at the buffer. The request may identify, for example, an element index of the requested data and may request the element value associated with that element index.

At step 1220, the buffer may be inspected to determine whether an element associated with the identified element index is present in the buffer. If so, processing proceeds to step 1230 and the requested data element is simply looked up in the buffer. Processing then proceeds to step 1250 and the requested data is returned. If the element does not exist in the buffer at step 1220, processing proceeds to step 1240.

At step 1220, it may determined that the requested data element is not stored in the buffer. This may be because the requested data point was downsampled and removed from the buffer, or because the requested data point never existed in the buffer. In either case, it may still be possible to derive the requested data from the data that exists in the buffer.

The missing data values may be interpolated by determining a relationship between the element values and the element indexes stored in the buffer. For example, a regression analysis may be performed in order to determine an acceptable approximate formula that relates the element values and the element indexes of the buffer. For example, different equations relating the element values to the element indexes (e.g., linear equations, polynomial equations, etc.) may be applied to the data in the buffer until an error value indicating a fitness of the equation for modeling the data is reduced below a predetermined threshold. The fitness may be represented, for example, by any error metric such as a least-squares metric. The regression analysis may begin with an equation including a small exponent (e.g., y=ax+b) and increasing the value of the exponent (e.g., y=$ax^2$+bx+c) until the error falls below the threshold. For example, the data in FIG. 11C can be modeled as: element value=element index$^2$.

Once the relationship between the element values and element indexes is established, the relationship may be applied to determine the estimated element value associated with the requested element index. Processing then proceeds to step 1250.

At step 1250, the requested data is returned.

One or more entities may serve as requesting entities that request data from the buffer in accordance with the procedure described above. The buffer may be stored on the requesting entity, as in the case where a single computer maintains the buffer and analyzes data from the buffer. Alternatively, FIG. 13 depicts an exemplary client/server configuration for requesting data from a buffer.

Figure 13:
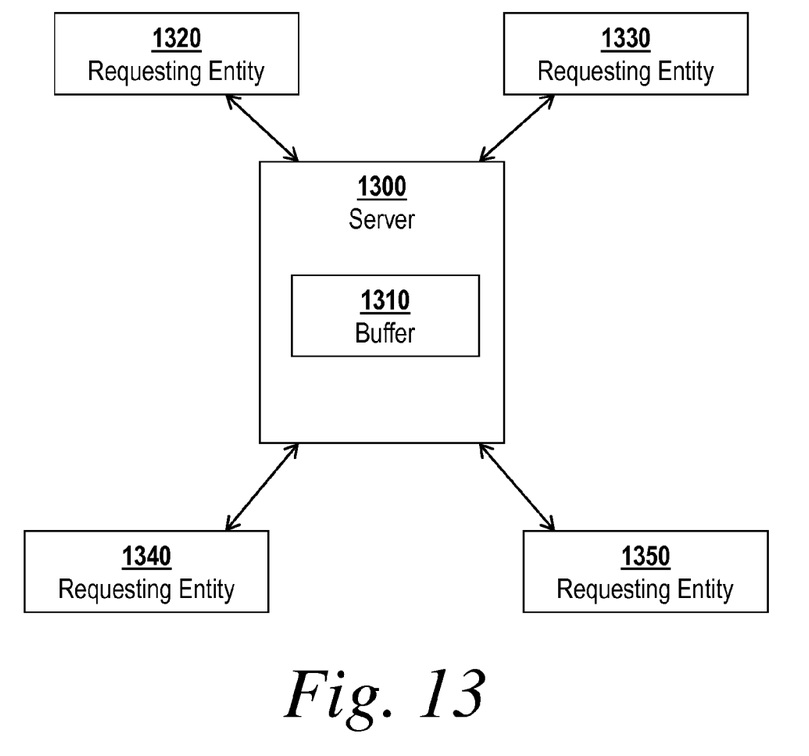
FIG. 13 depicts an exemplary client/server configuration for requesting data from a buffer.

As shown in FIG. 13, a central server 1300 stores and maintains a buffer 1310. The server 1300 may be, for example, a personal computer, a dedicated mainframe server, a mobile computer such as a tablet or phone, or a custom electronic device. Requesting entities 1320, 1330, 1340, 1350 may request data from the buffer 1310 by sending requests to the server 1300. Additionally, the requesting entities 1320, 1330, 1340, 1350 may request that data be added to the buffer by sending an appropriate data_add request to the server 1300. The server 1300 may be tasked with managing access to the buffer 1310 and with maintaining data integrity in the buffer 1310. The server 1300 may detect when the buffer 1310 is at or near capacity, and may apply one or more rules to downsample the data. Examples of such rules are shown in FIG. 14.

Figure 14:
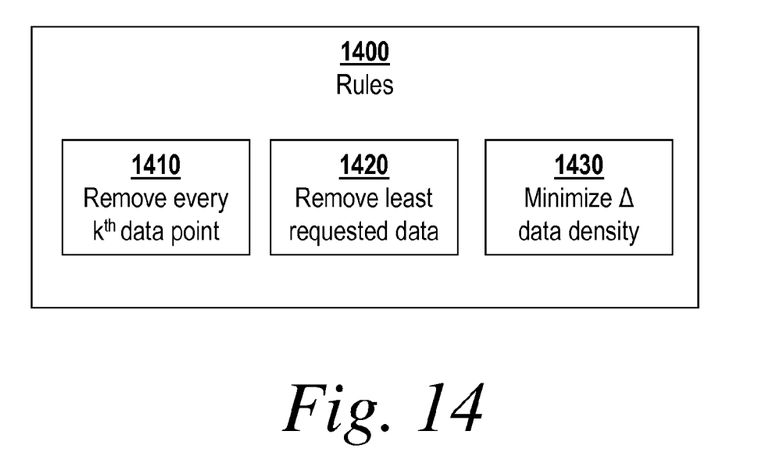
FIG. 14 depicts exemplary rules for downsampling the data in the buffer.

Referring to FIG. 14, rules 1400 may include one or more instructions for downsampling the buffer. The rules may be programmatically determined and/or user-defined. The buffer may be downsampled according to the same rule each time, or the downsampling may be context-dependent, applying a different rule depending on conditions in the buffer, the server or the requesting entities.

One example of a rule 1410 which has been previously discussed is to simply remove every $k^{th}$ data point. k may be any integer value from 2 to n (the maximum capacity of the buffer). The lower the value of k, the more space will be freed from the buffer. Accordingly, the value of k may be either predetermined, or may be determined dynamically depending on conditions related to the buffer. For example, if the buffer stores data associated with a simulation of a model and the simulation is nearing its end, then it is unlikely that a large amount of additional data will need to be stored in the buffer before the simulation is finished. Accordingly, a relatively high value of k may be selected so that only a few data points are removed from the buffer. On the other hand, if it is known that the simulation will continue to run for a long period of time, a small value of k may be selected in order to remove more values from the buffer and therefore further increase the storage available in the buffer. Additionally, two or more values may be used for k in the same downsampling procedure (e.g., "remove every $2^{nd}$ value and every $5^{th}$ value," or "begin by removing every $2^{nd}$ value and then remove every $3^{rd}$ value," etc.).

Another rule 1420 is to remove the least-requested data. If this rule is selected, a counter may be associated with each data element. The counter may identify how many times the data element has been requested. When the buffer must be downsampled, the counter may be consulted to determine which data elements are used the least. These data elements may be removed to make room for future data elements.

If there is only a single requesting entity, then the counter may reflect the number of times that the single requesting entity has requested the data. Alternatively, if there are multiple requesting entities, then the counter may reflect the cumulative number of times that the data element has been requested by all the requesting entities. In some embodiments, some requesting entities may be deemed to be more or less important than other requesting entities. Accordingly, requests from the more important requesting entities may be weighted in order to preserve the data requested most often by the more important requesting entities.

A further rule 1430 is to minimize the change in data density when the buffer is downsampled. For example, if the buffer includes element indexes "1-2-3-10," then removing the value "10" causes the average distance between element indexes to go from an original value of 3 to a new value of 1. On the other hand, removing the value "2" causes the average distance to change from 3 to 4.5. Accordingly, in this example, the value 2 would be removed.

Minimizing the change in density may, in some situations, make it easier to interpolate values for data that is removed. In the above example, consider what happens if a requesting entity requests the data associated with the element index "10" after the data element has been removed. In this situation, the existing data ("1-2-3") must be used to extrapolate a value that is more than three times the maximum value stored in the buffer. Particularly in situations where the data values change at an increasing rate (e.g., exponential growth), this extrapolation may be problematic. On the other hand, if the value "2" is requested after the value "2" is removed, it is simpler to interpolate between the values of "1" and "3," which continue to be stored in the buffer.

Using the above-described techniques, space can be freed in a buffer so that additional data may be added to the buffer. However, the data is removed in such a way (i.e., by reducing the data density of the buffer rather than simply removing data from the front or back of the buffer) that the removed data can still be interpolated from the data remaining in the buffer.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. An electronic-device implemented method comprising:
   interacting with a buffer using a processor of an electronic device, the buffer:
   holding a plurality of input data points, the plurality of input data points being associated with a plurality of indices, the plurality of indices representing positions of the plurality of input data points with respect to each other,
   having a capacity, and
   having a data density representing a logical distance between indices of adjacent ones of the plurality of input data points;
   identifying that the buffer is at or near a threshold,
   the threshold related to the capacity of the buffer, and
   the identifying performed using the processor of the electronic device; and
   applying a rule to the buffer when the buffer is at or near the threshold, where the applying:
   downsamples the plurality of input data points by removing at least one intermediate input data point from the buffer, and
   reduces the data density of the buffer.

2. The method of claim 1, wherein the rule specifies removing every $k^{th}$ K input data point from the buffer, where k is a positive integer.

3. The method of claim 1, wherein the rule comprises removing from the buffer a least-used data point that is a subject of a least number of requests from a requesting entity.

4. The method of claim 1, wherein the rule comprises removing from the buffer a least-used data point that is a subject of a least cumulative number of requests from a plurality of requesting entities.

5. The method of claim 1, wherein the data density represents an average distance between indices of adjacent ones of the plurality of input data points.

6. The method of claim 1, wherein the threshold is the capacity of the buffer.

7. The method of claim 1, further comprising:
receiving a request for a requested data point that is not stored in the buffer;
interpolating between two of the plurality of input data points stored in the buffer to derive the requested data point; and
returning the requested data point in response to the request.

8. The method of claim 1, wherein each index is associated with a time at which a respective data point was collected, and wherein the logical distance between the indices of the adjacent ones of the plurality of input data points is a temporal distance.

9. The method of claim 1, wherein the plurality of input data points represent a variable transport delay representative of delayed data provided to the buffer, the variable transport delay used by a dynamic system represented in a model by one or more differential equations.

10. The method of claim 9, wherein the variable transport delay is determined by:
identifying an initial time at which one of the plurality of input data points starts and an ending time at which the one of the plurality of input data points ends;
calculating an instantaneous time delay using the initial time, the ending time and the input data point;
integrating the instantaneous time delay; and
assigning the integrated instantaneous time delay as the variable transport delay.

11. A non-transitory device readable storage medium holding instructions, the instructions comprising:
instructions that, when executed by a processor of an electronic device, cause the processor to:
interact with a buffer, the buffer:
holding a plurality of input data points, the plurality of input data points being associated with a plurality of indices, the plurality of indices representing positions of the plurality of input data points with respect to each other,
having a capacity, and
having a data density representing a logical distance between indices of adjacent ones of the plurality of input data points;
identifying that the buffer is at or near a threshold,
the threshold related to the capacity of the buffer, and
the identifying performed using the processor of the electronic device; and
apply a rule to the buffer when the buffer is at or near the threshold, where the applying:
downsamples the input data by removing at least one intermediate input data point from the buffer, and
reduces the data density of the buffer.

12. The medium of claim 11, wherein the rule comprises removing every $k^{th}$ input data point from the buffer, where k is a positive integer.

13. The medium of claim 11, wherein the downsampling of the plurality of input data occurs when the buffer is at the capacity.

14. The medium of claim 11, further holding instructions for:
receiving a request for a requested data point that is not stored in the buffer; and
interpolating between two of the plurality of input data points stored in the buffer to derive the requested data point; and
returning the requested data point in response to the request.

15. The medium of claim 11, wherein the plurality of input data points represent a variable transport delay representative of delayed data provided to the buffer, the variable transport delay used by a dynamic system represented in a model by one or more differential equations.

16. A system comprising:
a storage for storing a buffer; and
a processor for:
interacting with the buffer, the buffer:
storing a plurality of input data points, the plurality of input data points being associated with a plurality of indices, the plurality of indices representing positions of the plurality of input data points with resect to each other,
having a capacity, and
having a data density representing a logical distance between indices of adjacent ones of the plurality of input data points;
identifying that the buffer is at or near a threshold,
the threshold related to the capacity of the buffer, and
the identifying performed using the processor of the electronic device; and
applying a rule to the buffer when the buffer is at or near the threshold, where the applying:
downsamples the plurality of input data points by removing at least one intermediate input data point from the buffer, and
reduces the data density of the buffer.

17. The system of claim 16, wherein the rule comprises removing every $k^{th}$ input data point from the buffer, where k is a positive integer.

18. The system of claim 16, wherein the downsampling of the plurality of input data occurs when the buffer is at the capacity.

19. The system of claim 16, wherein the processor further:
receives a request for a requested data point that is not stored in the buffer; and
interpolates between two of the plurality of input data points stored in the buffer to derive the requested data point; and
returns the requested data point in response to the request.

20. The system of claim 16, wherein the plurality of input data points represent a variable transport delay representative of delayed data provided to the buffer, the variable transport delay used by a dynamic system represented in a model by one or more differential equations.

* * * * *

UNITED STATES PATENT AND TRADEMARK OFFICE
CERTIFICATE OF CORRECTION

| | | |
|---|---|---|
| PATENT NO. | : 8,700,366 B1 | Page 1 of 1 |
| APPLICATION NO. | : 13/470891 | |
| DATED | : April 15, 2014 | |
| INVENTOR(S) | : Fu Zhang et al. | |

It is certified that error appears in the above-identified patent and that said Letters Patent is hereby corrected as shown below:

In the Claims

Column 16, line 66, in Claim 2, after "$k^{th}$" delete "K".

Column 18, line 30, in Claim 16, delete "resect" and insert --respect-- in lieu thereof.

Signed and Sealed this
Twenty-third Day of September, 2014

Michelle K. Lee
*Deputy Director of the United States Patent and Trademark Office*